(12) United States Patent
Masuda

(10) Patent No.: US 7,450,283 B2
(45) Date of Patent: Nov. 11, 2008

(54) MULTI-BEAM LIGHT SOURCE UNIT, OPTICAL SCANNING DEVICE, IMAGE FORMATION APPARATUS, LIGHT BEAM COMBINING UNIT, OPTICAL SYSTEM, OPTICAL APPARATUS

(75) Inventor: Koji Masuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 207 days.

(21) Appl. No.: 11/400,373

(22) Filed: Apr. 10, 2006

(65) Prior Publication Data

US 2006/0256183 A1 Nov. 16, 2006

(30) Foreign Application Priority Data

Apr. 18, 2005 (JP) .............................. 2005-120029

(51) Int. Cl.
*G02B 26/08* (2006.01)
(52) U.S. Cl. ........................................ 359/204
(58) Field of Classification Search .................. 359/204
See application file for complete search history.

(56) References Cited

U.S. PATENT DOCUMENTS 6,301,273 B1 * 10/2001 Sanders et al. .................. 372/6

FOREIGN PATENT DOCUMENTS

| JP | 9-189873 | 7/1997 |
| JP | 9-230260 | 9/1997 |
| JP | 11-185800 | 7/1999 |
| JP | 2001-13433 | 1/2001 |
| JP | 2001-315011 | 11/2001 |
| JP | 2003-121772 | 4/2003 |

OTHER PUBLICATIONS

Hisao Kukuta, et al., "Optical Control According to Lattice Structure Finer than Wavelength", Optics, vol. 27, No. 1, 1998, pp. 12-17 (with English translation).

* cited by examiner

*Primary Examiner*—Euncha P Cherry
(74) *Attorney, Agent, or Firm*—Oblon, Spivak, McClelland, Maier & Neustadt, P.C.

(57) ABSTRACT

A multi-beam light source unit is disclosed that has high layout degree of freedom and low manufacturing cost. The multi-beam light source unit includes two or more light sources, two or more first optical systems that shape light beams from the light sources, and a light beam combining element with a periodic structure of a period shorter than wavelengths of the light beams. The light beams are incident on the light beam combining element from different directions, and the light beam combining element transmits at least portions of the light beams nearly in the same direction.

19 Claims, 17 Drawing Sheets

⊙ PARALLEL TO THE PERIODICAL STRUCTURE

↕ PERPENDICULAR TO THE PERIODICAL STRUCTURE (a)  (b)  (c)

TM POLARIZATION    TE POLARIZATION

FAR FIELD PATTERN

POLARIZATION DIRECTION

ACTIVE LAYER

CIRCULAR POLARIZED

MULTI-BEAM LIGHT SOURCE UNIT, OPTICAL SCANNING DEVICE, IMAGE FORMATION APPARATUS, LIGHT BEAM COMBINING UNIT, OPTICAL SYSTEM, OPTICAL APPARATUS

BACKGROUND OF THE INVENTION

1. Field of the Invention

The present invention relates to a multi-beam light source unit able to scan light beams from plural light sources at the same time and to scan a surface along plural lines, an optical scanning device having the multi-beam light source unit, an image formation apparatus having the optical scanning device, such as a copier, a printer, a facsimile, a plotter or others, a light beam combining unit used in the multi-beam light source unit, an optical system, and an optical apparatus having the light beam combining unit. The light beam combining unit of the present invention is applicable to a combination element used in optical communication.

2. Description of the Related Art

In these years, along with an increase of printing speed of image formation apparatuses, it is desired to improve writing density. For this purpose, in an optical scanning device constituting the image formation apparatus, it is attempted to increase the speed of light deflection of a light deflector, namely to increase the rotational speed of a polygon mirror, so as to increase the scanning speed and scanning density.

When the rotational speed is increased, however, noise and heat become a problem. Hence, there is a limit to the rotational speed.

On the other hand, Japanese Laid-Open Patent Application No. 2003-121772 (hereinafter referred to as "reference 1") discloses a technique to increase the scanning speed and scanning density, specifically, a multi-beam light source unit is used to scan plural light beams at the same time and to write plural lines at the same time.

In a multi-beam light source unit able to scan multiple light beams at the same time, for example, a light source able to generate multiple light beams can be used to replace a conventional single-beam light source in an optical scanning device. For example, a light source able to generate multiple light beams may be a package including a laser array having multiple light emitting spots.

However, when fabricating a laser array light source, along with an increase of the light emitting spots, such as, 4, 8, ..., it becomes technically more and more difficult, and this makes the laser array light source very expensive.

Many methods are proposed to use plural single-beam light sources (one package has one light emitting spot) to realize the multi-beam light source unit.

The single-beam light sources are inexpensive, and can be mass produced. For example, the cost of four single-beam light sources is lower than a multi-beam light source unit having four light emitting spots.

In order to fabricate the multi-beam light source unit by using many single-beam light sources, it is proposed to use beam combining elements, and several types of beam combining elements are proposed.

For example, Japanese Laid-Open Patent Application No. 9-189873 (hereinafter referred to as "reference 2") discloses a beam combining element in which two light beams are incident on a half mirror at 90 degrees, and the two light beams are combined at nearly the same direction.

Japanese Laid-Open Patent Application No. 9-230260 (hereinafter referred to as "reference 3") discloses a beam combining element in which two light beams are incident on a polarized light beam splitter or a polarized beam half mirror at 90 degrees, and the two light beams are combined to be in nearly the same direction.

Japanese Laid-Open Patent Application No. 2001-013433 (hereinafter referred to as "reference 4") discloses a beam combining element in which two light beams are incident on a polarized light beam combining prism made from films roughly parallel to each other and the two light beams are combined at nearly the same direction.

In the beam combining elements disclosed in reference 2 or reference 3, the two light beams are incident at 90 degrees. This is required by the characteristics of the half mirror or the polarized beam splitter; specifically, these elements require the incidence angle of the light beam on the elements to be 90 degrees.

Due to this, the light source and the optical system have to be laid out to meet this requirement of a 90 degree incidence angle. This limits the degree of freedom of layout, and may require the multi-beam light source unit to be large sized, and in turn, cause the optical scanning device to be large.

Therefore, it is desirable to fabricate a beam combining element enabling a high degree of layout freedom.

In reference 4, in the polarized light beam combining splitter, it is required that two light beams be incident while being parallel to each other, namely, at zero degrees relative to each other. Similarly, this also limits the degree of freedom of layout.

From the point of view of combination of polarized light beams, the polarized light beam splitter and the polarized light beam combining prism disclosed in reference 3 or reference 4 are formed by bonding triangular prisms with thin films, and this polarized beam splitting film splits the incident light beam.

This thin film exhibits high beam splitting performance when being used at specified wavelengths and specified incidence angles, but suffers from the problem in that the beam splitting performance degrades significantly much when the wavelengths and incidence angles deviate from the specified values.

SUMMARY OF THE INVENTION

The present invention may solve one or more problems of the related art.

A preferred embodiment of the present invention may provide a light beam combining unit having high layout degree of freedom and low manufacturing cost, a multi-beam light source unit, an optical scanning device, an image formation apparatus, an optical system, and an optical apparatus using the light beam combining unit.

According to a first aspect of the present invention, there is provided a multi-beam light source unit, comprising: two or more light sources; two or more first optical systems that shape light beams from the light sources; and a light beam combining element having a periodic structure of a period shorter than wavelengths of the light beams, the light beams being incident on the light beam combining element from different directions, the light beam combining element emitting at least portions of the light beams nearly in the same direction.

As an embodiment, the light sources and the first optical systems are arranged so that the incident light beams are linearly polarized light beams having polarization states different from each other by 90 degrees.

As an embodiment, the linearly polarized light beams have the same polarization direction, and one of the first optical systems includes a $\lambda/2$ plate.

As an embodiment, a λ/4 plate is arranged behind the light beam combining element along a light propagating direction.

As an embodiment, there are four light sources and four first optical systems.

As an embodiment, each of the light sources emits at least two light beams.

As an embodiment, each of the light sources is a surface emitting semiconductor laser.

As an embodiment, each of the light sources is a blue light laser.

As an embodiment, the light beams from different directions have an acute angle in between.

As an embodiment, the light beam combining element has a plate shape.

As an embodiment, the incident light beams from different directions and the light beams emitted by the light beam combining element nearly in the same direction are on opposite sides of the light beam combining element.

According to a second aspect of the present invention, there is provided an optical scanning device, comprising: a multi-beam light source unit; a second optical system that guides a light beam from the multi-beam light source unit to a light deflector; the light deflector that deflects and scans the light beam from the second optical system; and a third optical system that forms a light spot of the scanning light beam deflected by the light deflector on a scanning surface, wherein the multi-beam light source unit includes: two or more light sources; two or more first optical systems that shape light beams from the light sources; and a light beam combining element having a periodic structure of a period shorter than wavelengths of the light beams, the light beams being incident on the light beam combining element from different directions, the light beam combining element transmitting at least portions of the light beams nearly in the same direction.

According to a third aspect of the present invention, there is provided an image formation apparatus, comprising: an optical scanning device, wherein the optical scanning device includes a multi-beam light source unit; a second optical system that guides a light beam from the multi-beam light source unit to a light deflector; the light deflector that deflects and scans the light beam from the second optical system; and a third optical system that forms a light spot of the scanning light beam deflected by the light deflector on a scanning surface, wherein the multi-beam light source unit includes two or more light sources; two or more first optical systems that shape light beams from the light sources; and a light beam combining element having a periodic structure of a period shorter than wavelengths of the light beams, the light beams being incident on the light beam combining element from different directions, the light beam combining element transmitting at least portions of the light beams nearly in the same direction.

According to a fourth aspect of the present invention, there is provided a light beam combining element, comprising: a periodic structure of a period shorter than wavelengths of the light beams, wherein the light beams are incident on the light beam combining element from different directions, and the light beam combining element transmits at least portions of the light beams nearly in the same direction.

As an embodiment, the light beams from different directions separated by an acute angle.

As an embodiment, the light beam combining element has a plate shape.

As an embodiment, the incident light beams from different directions and the light beams transmitted by the light beam combining element nearly in the same direction are on opposite sides of the light beam combining element.

According to a fifth aspect of the present invention, there is provided an optical system, comprising: a light beam combining element, wherein the light beam combining element includes a periodic structure of a period shorter than wavelengths of the light beams, wherein light beams are incident on the light beam combining element from different directions, and the light beam combining element transmits at least portions of the light beams nearly in the same direction.

According to a sixth aspect of the present invention, there is provided an optical apparatus, comprising: an optical system, wherein the optical system including a light beam combining element, wherein the light beam combining element includes a periodic structure of a period shorter than wavelengths of the light beams, wherein light beams are incident on the light beam combining element from different directions, and the light beam combining element transmits at least portions of the light beams nearly in the same direction.

According to the multi-beam light source unit of the present invention, because a light beam combining element having a periodic structure of a period shorter than the incident light beams is used, it is possible to realize a novel light beam combining unit at low manufacturing cost.

In addition, since the incident light beams are linearly polarized light beams and have polarization states different from each other by 90 degrees, it is possible to separately control the incident light beams.

In addition, because the linearly polarized light beams have the same polarization direction, and one of the first optical systems includes a λ/2 plate so that one of the incident light beams is rotated, it is possible for the light beams transmitted from the first optical system to have the same far field pattern. Further, if an optical system is provided after the first optical system to direct all the incident light beams, it is possible to make the thus obtained light spots equal.

In addition, because a λ/4 plate is arranged behind the light beam combining element along a light propagating direction, the polarization state of the light beam from the light beam combining element is converted from a linear polarization state to a circular polarization state; thus, the polarization states of all light beams are equal. Further, if an optical system is provided after the λ/4 plate to direct all the incident light beams, it is possible to reduce the influence of the dependence of light transmittance and reflectivity on the polarization direction, and to equalize the intensity of light beams passing through the optical system.

In addition, because single-beam light sources are used, it is possible to increase the number of light beams at low cost.

In addition, because each of the light sources emits at least two light beams, it is possible to increase the number of light beams by just changing the light sources.

In addition, because each of the light sources is a surface emitting semiconductor laser, it is possible to increase the number of light beams by changing the light sources to add a polarization control element.

In addition, because each of the light sources is a blue light laser, the wavelength of the incident light beams is short, and it is possible to reduce the size of the light spot.

In addition, because the light beams from different directions are separated by an acute angle, it is possible to change the angle θ between incident light beams according to the period P of the diffractive element, thus increasing the layout degree of freedom.

In addition, because the light beam combining element has a plate shape, different from the polarized light beam splitter and the light beam combining prism of the related art, it is possible to obtain a thin optical element with the thickness of the optical element being independent of the width D of the incident light beam. This can further reduce the cost and the size of the system.

In addition, because the incident light beams from different directions and the light beams emitted by the light beam combining element nearly in the same direction are on opposite sides of the light beam combining element, different from a configuration of the related art having a half mirror, it is possible to arrange the two light sources to be close, and this increases the layout degree of freedom.

According to the optical scanning device of the present invention, because a novel and inexpensive multi-beam light source unit is used, it is possible to obtain a high speed and high density optical scanning device. Further, the optical scanning device is able to scan two or more light beams. Further, because the light beams have the same far field pattern, and their polarization states are the same, it is possible to scan plural light beams on a surface with the same light spots and the same intensity.

On the other hand, by using an optical scanning device having the same printing speed and the same scanning density as the single-beam light source, it is possible to reduce the rotational speed of the optical deflector, and this further reduces power consumption, noise of rotational motion, and heat generation.

According to the image formation apparatus of the present invention, because an optical scanning device having a multi-beam light source unit is used as an optical write unit (exposure unit), it is possible to increase the printing speed and write density of the image formation apparatus.

According to the light beam combining element of the present invention, because the light beam combining element has a periodic structure of a period shorter than the incident light beams, it is possible to realize a novel light beam combining unit at low manufacturing cost.

In addition, because the light beams from different directions are separated by an acute angle, it is possible to change the angle θ between incident light beams according to the period P of the diffractive element, thus increasing the layout degree of freedom.

In addition, because the light beam combining element has a plate shape, different from the polarized light beam splitter and the light beam combining prism of the related art, it is possible to obtain a thin optical element with the thickness of the optical element being independent of the width D of the incident light beam. This can further reduce the cost and the size of the system.

In addition, because the incident light beams from different directions and the light beams emitted by the light beam combining element nearly in the same direction are on opposite sides of the light beam combining element, different from a configuration of the related art having a half mirror, it is possible to arrange the two light sources to be close, and this increases the layout degree of freedom.

According to the optical system of the present invention, it is possible to realize a novel, inexpensive and compact optical system having high layout degree of freedom.

According to the optical apparatus of the present invention, it is possible to realize an inexpensive and compact optical apparatus having novel characteristics.

These and other objects, features, and advantages of the present invention will become more apparent from the following detailed description of preferred embodiments given with reference to the accompanying drawings.

BRIEF DESCRIPTION OF THE DRAWINGS

FIG. 1A is a side view and FIG. 1B is a plan view;

FIG. 2A is a side view and FIG. 2B is a plan view;

FIG. 11A is a side view and FIG. 11B is a plan view;

FIG. 15A shows a light beam combining element using a half mirror, and FIG. 15B shows a light beam combining element using a polarized beam splitter;

FIG. 19A is a plan view and FIG. 19B is a side view;

FIG. 22A is a side view and FIG. 22B is a plan view;

DESCRIPTION OF THE PREFERRED EMBODIMENTS

Below, preferred embodiments of the present invention are explained with reference to the accompanying drawings.

Below, a general description is made of a periodic structure having a period shorter than the wavelength of incident light (please refer to "Kikuta et al, Optics, Vol. 27, No. 1, pp. 12-17").

In an optical element including two media having different refractive indexes (for example, one is air and the other is an isotropic medium), where the two media are made into periodic structures each having periods shorter than the wavelength of incident light (such a structure is called "SWS", standing for "sub-wavelength structure"), an optical anisotropic phenomenon occurs, which is known as "form birefringence".

Generally, it is necessary to use quartz, calcite or other birefringence crystals to obtain the birefringence property. It is difficult to change the birefringence property, which is an intrinsic property of a material.

However, as for the form birefringence, because it is not necessary to use special crystals and the form birefringence property can be changed by changing the shape of a common medium, it can be relatively easily controlled. Due to this, it is possible to realize a polarized beam splitter without using birefringence crystals. In addition, by controlling the effective refractive index through the shape of the medium, it is possible to form an anti-reflection mechanism on an optical surface.

In addition, in an optical element having a sub-wavelength structure, it is well known that the birefringence property and the anti-reflection performance thereof have little dependence on the incidence angle of the incident light beam.

The present embodiment is based on the above knowledge.

First Embodiment

Figure 1:
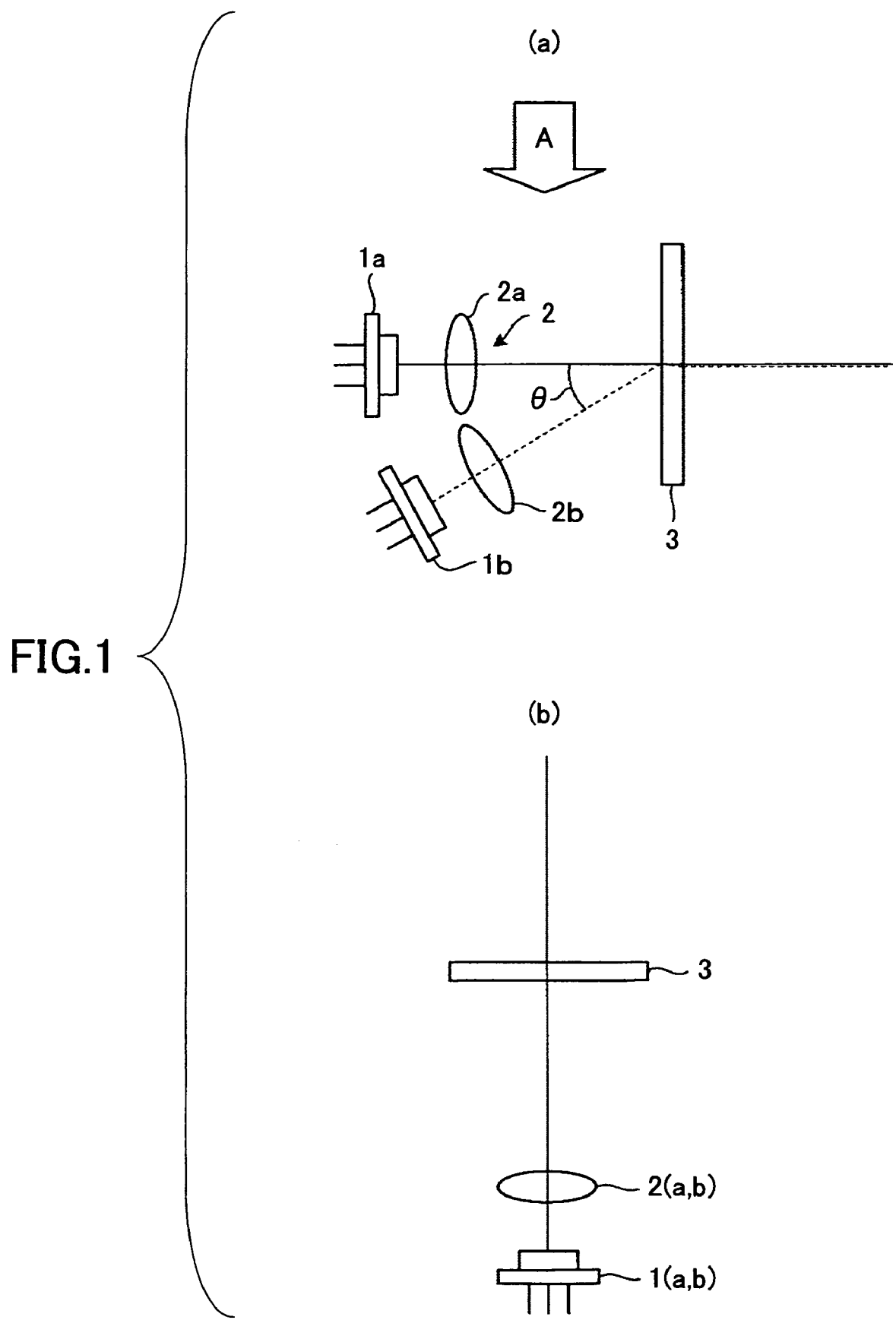
FIG. 1A and FIG. 1B are schematic views of a multi-beam light source unit according to a first embodiment of the present invention, where

FIG. 1A and FIG. 1B are schematic views of a multi-beam light source unit according to a first embodiment of the present invention, where, FIG. 1A is a side view and FIG. 1B is a plan view.

As shown in FIG. 1A and FIG. 1B, the multi-beam light source unit of the present embodiment includes two semiconductor lasers $1a$ and $1b$ serving as light sources; a first optical system 2 which condenses the divergent (non-parallel) light beams emitted from the semiconductor lasers $1a$ and $1b$, and converts the divergent light beams into parallel beams, or shapes the divergent light beams emitted from the semiconductor lasers $1a$ and $1b$; and a light beam combining element 3, onto which the two light beams from the first optical system 2 are incident with an angle of θ therebetween.

As shown in FIG. 1A, the first optical system 2 includes two single-piece lenses $2a$ and $2b$. Certainly, the first optical system 2 may also include mirrors, or plural optical elements.

The light beam combining element 3 transmits at least portions of the two incident light beams with the angle of θ therebetween nearly in the same direction. For example, the two exiting light beams may be in the same direction or have a small angle φ therebetween; in other words, the two incident light beams are combined by the light beam combining element 3.

FIG. 1B is a plan view of the multi-beam light source unit viewed along an arrow A in FIG. 1A. The arrow A in FIG. 1A is in the plane of the paper.

As shown in FIG. 1B, the semiconductor lasers $1a$ and $1b$ and the two single-piece lenses $2a$ and $2b$, both sets of which are stacked in a plane perpendicular to the plane of the paper, are superimposed in FIG. 1B. Strictly speaking, the semiconductor lasers $1a$ and $1b$ and the two single-piece lenses $2a$ and $2b$ form an angle of θ as shown in FIG. 1A. Although part of the semiconductor laser $1b$ and the single-piece lens $2b$, which are on the back side in FIG. 1B, are visible, illustration of the semiconductor laser $1b$ and the single-piece lens $2b$ are omitted.

Figure 2:
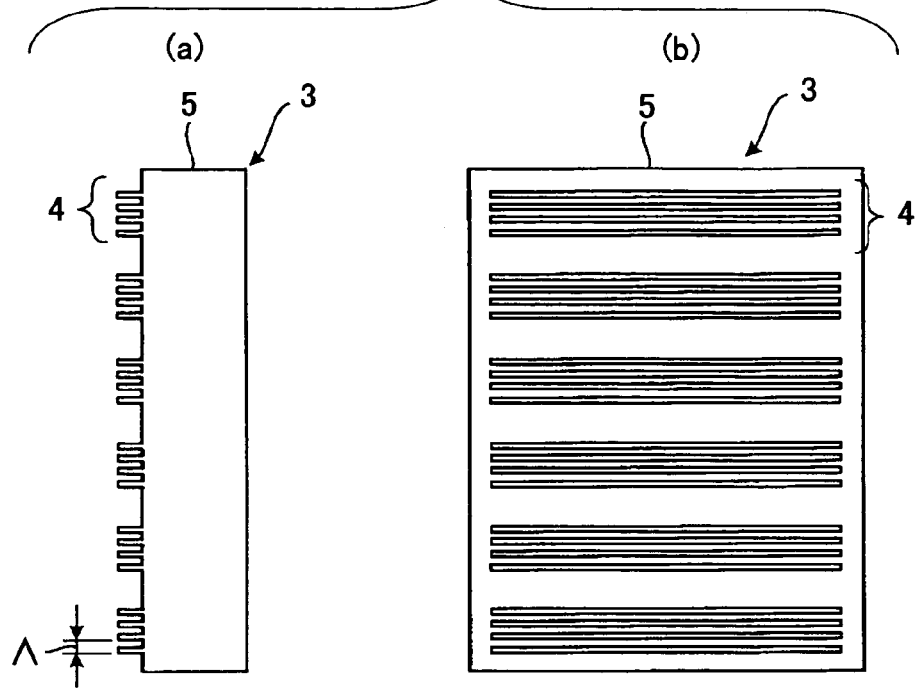
FIG. 2A and FIG. 2B are enlarged views of a light beam combining element in the present embodiment, where

FIG. 2A and FIG. 2B are enlarged views of the light beam combining element 3 in the present embodiment, where FIG. 2A is a side view and FIG. 2B is a plan view.

As shown in FIG. 2A and FIG. 2B, on the surface of the light beam combining element 3, through which light beams are transmitted, a periodic structure 4 is formed having a period shorter than wavelengths of the semiconductor lasers $1a$ and $1b$.

In the example shown in FIG. 2A and FIG. 2B, the periodic structure 4 is formed from the same material as a substrate 5 of optical elements.

Specifically, where the period (pitch) of the periodic structure 4 is Λ, and the wavelength of the semiconductor lasers $1a$ and $1b$ is λ, the periodic structure 4 is fabricated to satisfy λ>Λ.

For example, an optical element having the periodic structure of a period shorter than the wavelength of the incident light can be fabricated by a combination of known fine processing technologies such as electron beam writing and dry etching.

In recent years, a duplication process, which is known as a "nanoimprint" technique, has been proposed that can be employed in mass production at low cost by using molds fabricated by the fine processing technologies. With this technique, the light beam combining element 3 can be fabricated at low cost compared to the polarized beam splitter or the beam combining prism.

Figure 3:
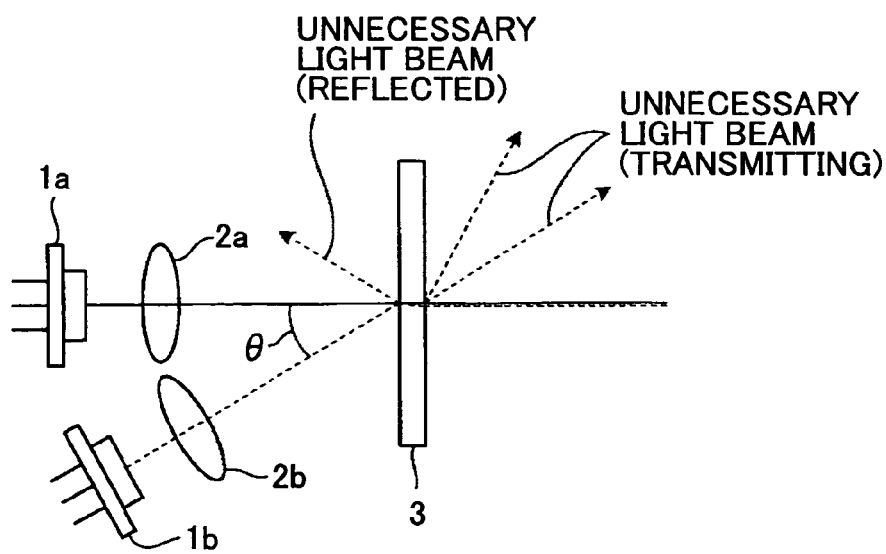
FIG. 3 is a schematic view illustrating the light beam combination function of the light beam combining element.

FIG. 3 is a schematic view illustrating the function of light beam combination of the light beam combining element 3.

As described above, the light beam combining element 3 combines at least portions of the two incident light beams. In other words, other portions of the incident light beams are not combined and are lost.

As shown in FIG. 3, the light beam emitted from the semiconductor laser $1a$ (indicated by a solid line) is incident onto the light beam combining element 3 perpendicularly, and is transmitted through the light beam combining element 3 substantially 100% except for Fresnel reflection on the interface of the light beam combining element 3.

On the other hand, the light beam emitted from the semiconductor laser $1b$ (indicated by dashed lines) is incident onto the light beam combining element 3 at an incidence angle of θ (an angle relative to the normal of the surface of the light beam combining element 3), and is diffracted by the light beam combining element 3. A portion of this incident beam is combined with the light beam emitted from the semiconductor laser $1a$. That is, as long as the refraction efficiency is not 100%, unnecessary light beams are generated.

Specifically, the reflected light component and the diffracted light beams, which diffracted light beams are transmitted through the light beam combining element 3 having diffraction orders other than the desired number of orders, belong to the unnecessary light beams. The unnecessary light beams are indicated by "reflected" ones and "transmitting" ones in FIG. 3.

The unnecessary light beams can be removed easily by an aperture or other mechanical parts, or by other optical elements, so they do not cause structural problems in the multi-beam light source unit.

The intensity of the light beams in the combined light beam can be adjusted to be equal by adjusting the light emission power levels of the semiconductor lasers 1a and 1b.

In this embodiment, the light beam combining element 3 does not include birefringence crystals or other special crystals, but exhibits the birefringence property through the shape of a common medium.

Figure 4:
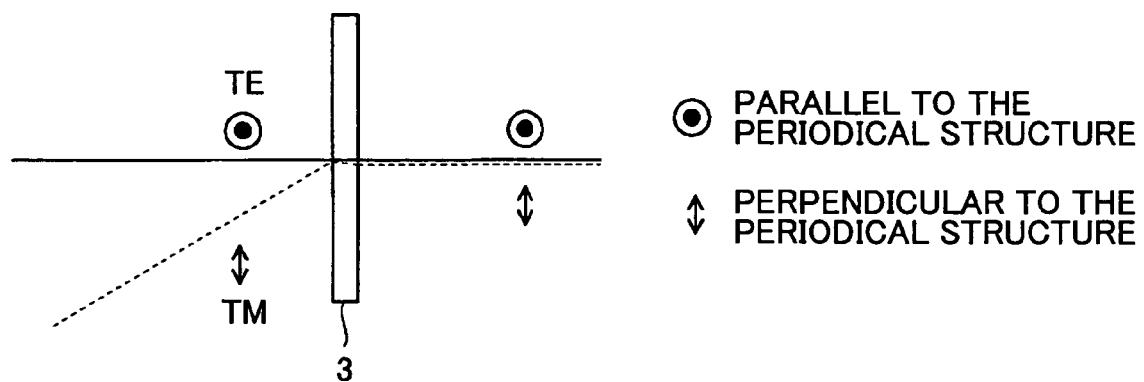
FIG. 4 is a schematic view illustrating the light polarization function of the light beam combining element.

FIG. 4 is a schematic side view illustrating the light polarization function of the light beam combining element 3.

Figure 5:
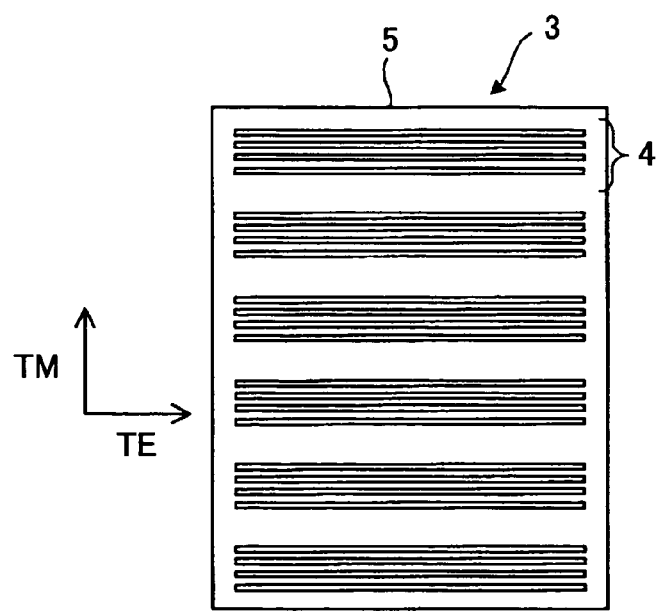
FIG. 5 is a schematic view explaining the definition of the polarization direction in the light beam combining element.

FIG. 5 is a schematic plan view explaining the light polarization function in the light beam combining element 3.

Specifically, the direction parallel to the grooves of the periodic structure 4 of the light beam combining element 3 is defined to be the "TE" polarization direction, and the direction perpendicular to the grooves of the periodic structure 4 of the light beam combining element 3 is defined to be the "TM" polarization direction.

Figure 6:
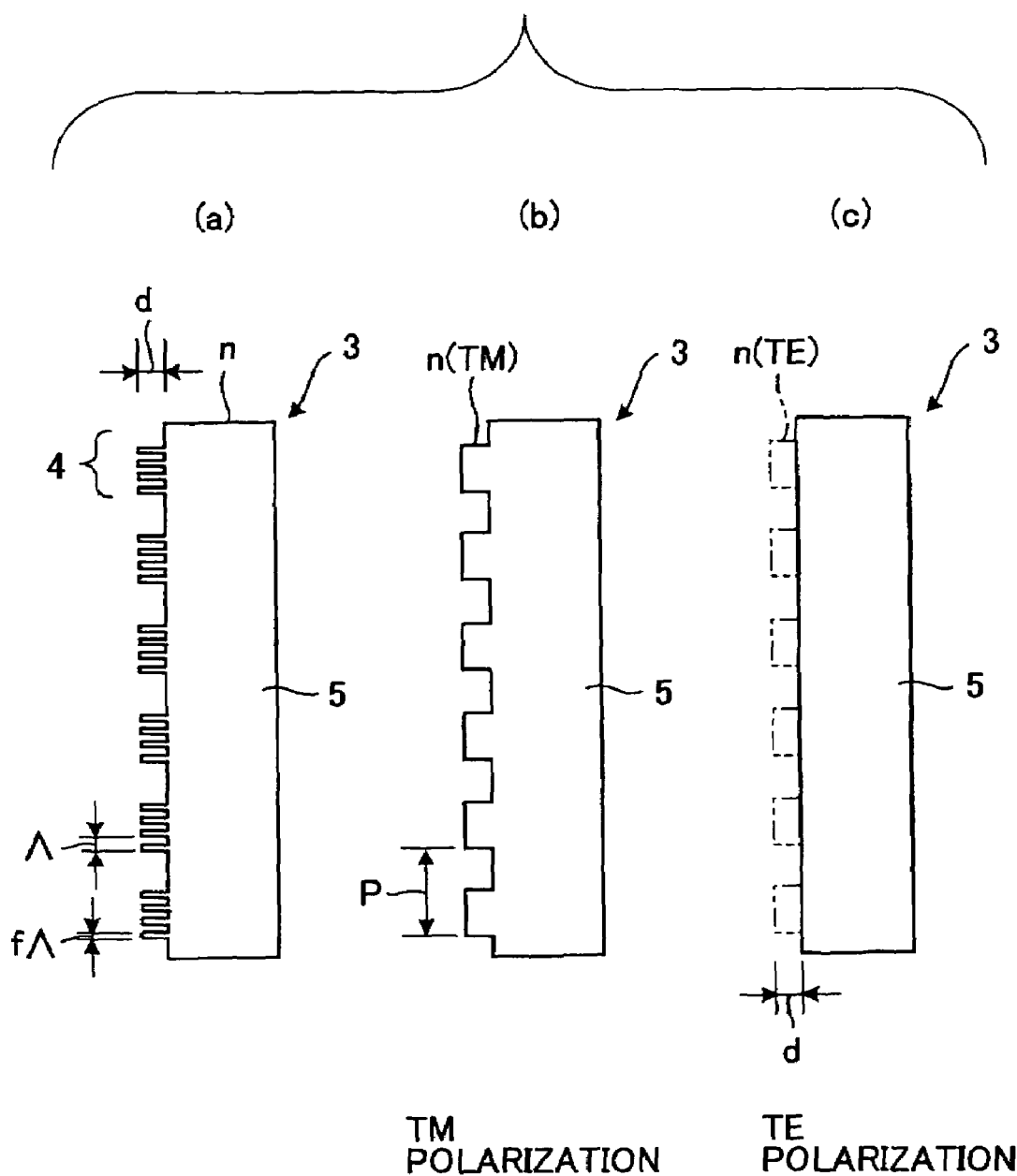
FIG. 6A through FIG. 6C are schematic views of the light beam combining element illustrating the polarization characteristics of the light beam combining element.

FIG. 6A through FIG. 6C are schematic views of the light beam combining element 3 illustrating the polarization characteristics of the light beam combining element 3.

In the light beam combining element 3, the refractive index of the periodic structure 4 changes along with the polarization direction of the incident light beam, and the behavior of the diffracted light also changes.

In FIG. 6A through FIG. 6C, it is assumed that the refractive index of the substrate 5 of the periodic structure 4 is represented by n. It is known that the refractive index of the periodic structure 4 which structure 4 has a period shorter than the wavelength of the incident light beam is expressed by an "effective refractive index".

As shown in FIG. 6A, the periodic structure 4 includes a periodic arrangement of air (the refractive index is 1) and the substrate 5 (the refractive index is n). Assume the period of the periodic structure 4 is Λ, and the width of one element of the structure formed from the same material as the substrate 5 is fΛ (f is a feeling factor), the refractive index n corresponding to different polarization directions (TE, TM) can be expressed as below.

$$n(TE) = \sqrt{\{fn^2 + (1-f)\}},$$

$$n(TM) = \sqrt{\{n^2/\{f+(1-f)n^2\}\}}$$

FIG. 6B shows a binary diffractive grating having a period P (here, P>λ) and a refractive index n(TM) relative to the TM polarized light beam.

FIG. 6C shows a binary diffractive grating having a period P and a refractive index n(TE) relative to the TE polarized light beam.

Generally, n(TE)>n(TM). Thus, for the TE polarized light beam, if the phase difference between the substrate portion (having a thickness of d) and the air portion of the grating is 2π, diffraction does not occur, and 100% of the incident light beam is transmitted through the light beam combining element 3.

$$2\pi\{n(TE)-1\}d/\lambda = 2\pi$$

In the thickness d of the substrate portion, for the TM polarized light beam, because the phase difference between the substrate portion and the air portion of the grating is not 2π, the light beam combining element 3 behaves as a binary grating having a period of P.

By appropriately selecting the period P using the diffraction formula, when the incident light beam is incident at an angle of θ, the diffracted light of the first order is transmitted at zero degrees (that is, perpendicular to the light beam combining element 3). The angle θ, λ and P satisfy the following formula (1).

$$\sin\theta = \lambda/P \qquad (1)$$

According to the present embodiment, the light beam combining element 3 transmits the TE polarized light beam, and diffracts the TM polarized light beam. By appropriately selecting the period P, a portion of the TM polarized beam can be transmitted nearly in the same direction as the TE polarized light beam.

Hence, as shown in FIG. 4, when two incident light beams coming from two different directions are linearly polarized light beams and have polarization states different from each other by 90 degrees, it is possible to separately control the incident light beams. The light sources 1a and 1b and the first optical system 2 can be arranged to produce this condition.

Second Embodiment

Figure 7:
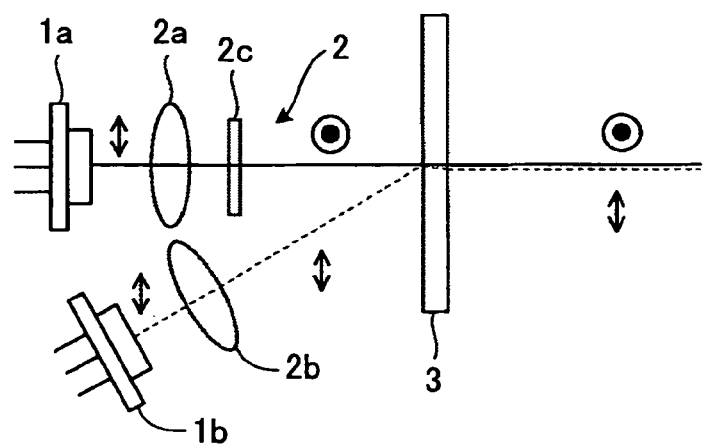
FIG. 7 is a schematic side view of a multi-beam light source unit according to a second embodiment of the present invention.

FIG. 7 is a schematic side view of a multi-beam light source unit according to a second embodiment of the present invention.

In the present embodiment, the same reference numbers are assigned to the same elements as those shown in the previous embodiment, and overlapping explanations are omitted.

Figure 8:
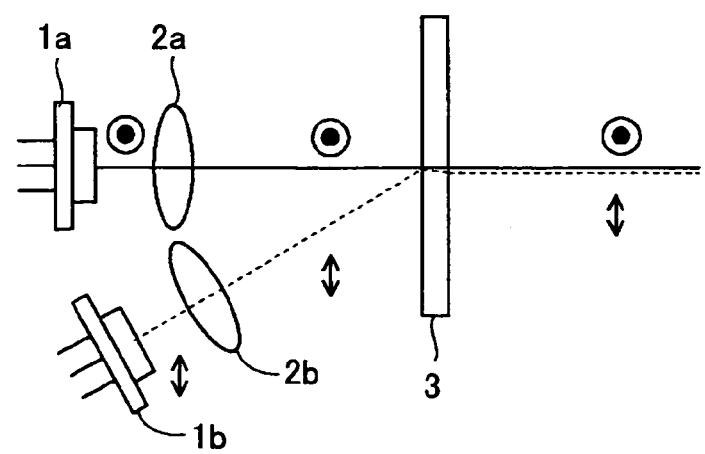
FIG. 8 is a schematic view of an arrangement of the multi-beam light source unit of the second embodiment allowing polarization directions of two polarized light beams to be different by 90 degrees.

FIG. 8 is a schematic view of an arrangement of the multi-beam light source unit of the second embodiment allowing polarization directions of two polarized light beams to be different by 90 degrees.

When the light sources are linearly polarized semiconductor lasers, in order that two incident light beams have polarization states different from each other by 90 degrees as shown in FIG. 4, the semiconductor lasers are arranged so that the polarization directions of the semiconductor lasers are different from each other by 90 degrees.

Figure 9:
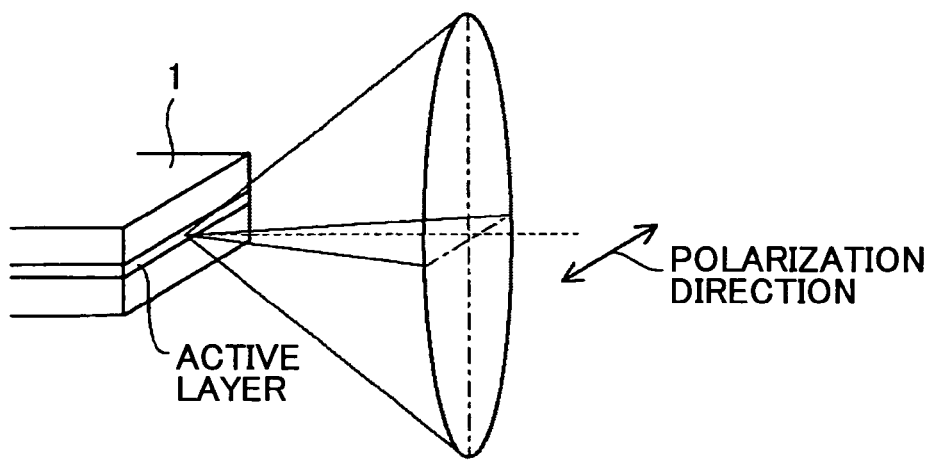
FIG. 9 is a schematic view of a portion of a semiconductor laser illustrating a light emission state of the semiconductor laser.

FIG. 9 is a schematic view of a portion of a semiconductor laser illustrating light emission of the semiconductor laser.

As shown in FIG. 9, a light beam emitted from an active layer of the semiconductor laser exhibits an elliptical distribution in a far field pattern, and the polarization direction is parallel to the active layer.

Thus, when the semiconductor lasers are arranged so that the polarization directions of the semiconductor lasers are different by 90 degrees, the far field patterns of the light beams emitted from the semiconductor lasers are different from each other. This indicates that when the light beams propagate through the same optical system, light spots of the two light beams have different shapes.

It is preferable that the light spots have different shapes in some applications of the multi-beam light source unit, but in many other applications, it is desirable that the light spots of the two light beams have the same shape.

As shown in FIG. 7, for the far field patterns of the light beams to be the same, the two semiconductor lasers can be arranged in the same direction. In this case, since the polarization directions of the semiconductor lasers also become the same, a λ/2 plate 2c is provided to rotate the polarization direction of the light beam from the semiconductor laser in the first optical system 2 by 90 degrees.

In doing so, the polarization directions of the light beams from the semiconductor lasers are different from each other by 90 degrees, and the far field patterns of the light beams also become the same.

Third Embodiment

Figure 10:
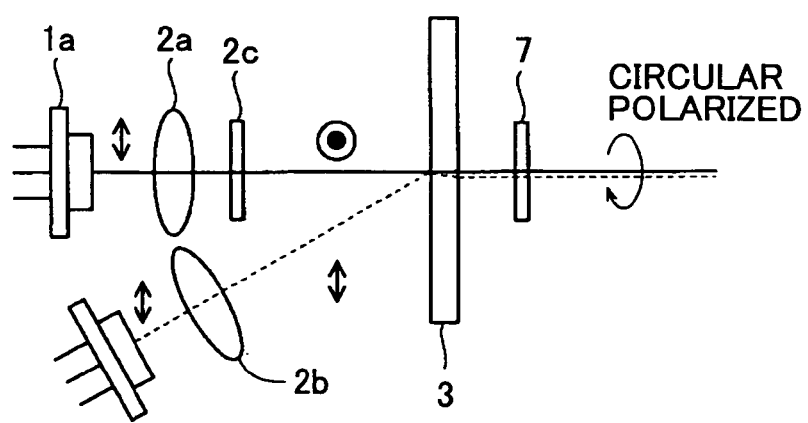
FIG. 10 is a schematic side view of a multi-beam light source unit according to a third embodiment of the present invention.

FIG. 10 is a schematic side view of a multi-beam light source unit according to a third embodiment of the present invention.

The two incident light beams combined by the light beam combining element 3 have polarization directions different from each other by 90 degrees. Hence, in an optical system for guiding the light beams from the multi-beam light source unit, because of the dependence of the light transmittance and reflectivity on the light polarization direction, intensities of the two light beams end up being different after the two light beams are transmitted through the optical system.

It is preferable that the intensities of the two light beams be different in some applications of the multi-beam light source unit, but in many other applications, it is desirable that the intensities of the two light beams be the same.

Hence, as shown in FIG. 10, a λ/4 plate 7 is arranged behind the light beam combining element 3 (downstream along the light propagating direction) to convert a linear polarization state to a circular polarization state.

In doing so, the linear polarization states of the two light beams are converted to a circular polarization state, and thus, the polarization states of the two light beams become the same.

Fourth Embodiment

Figure 11:
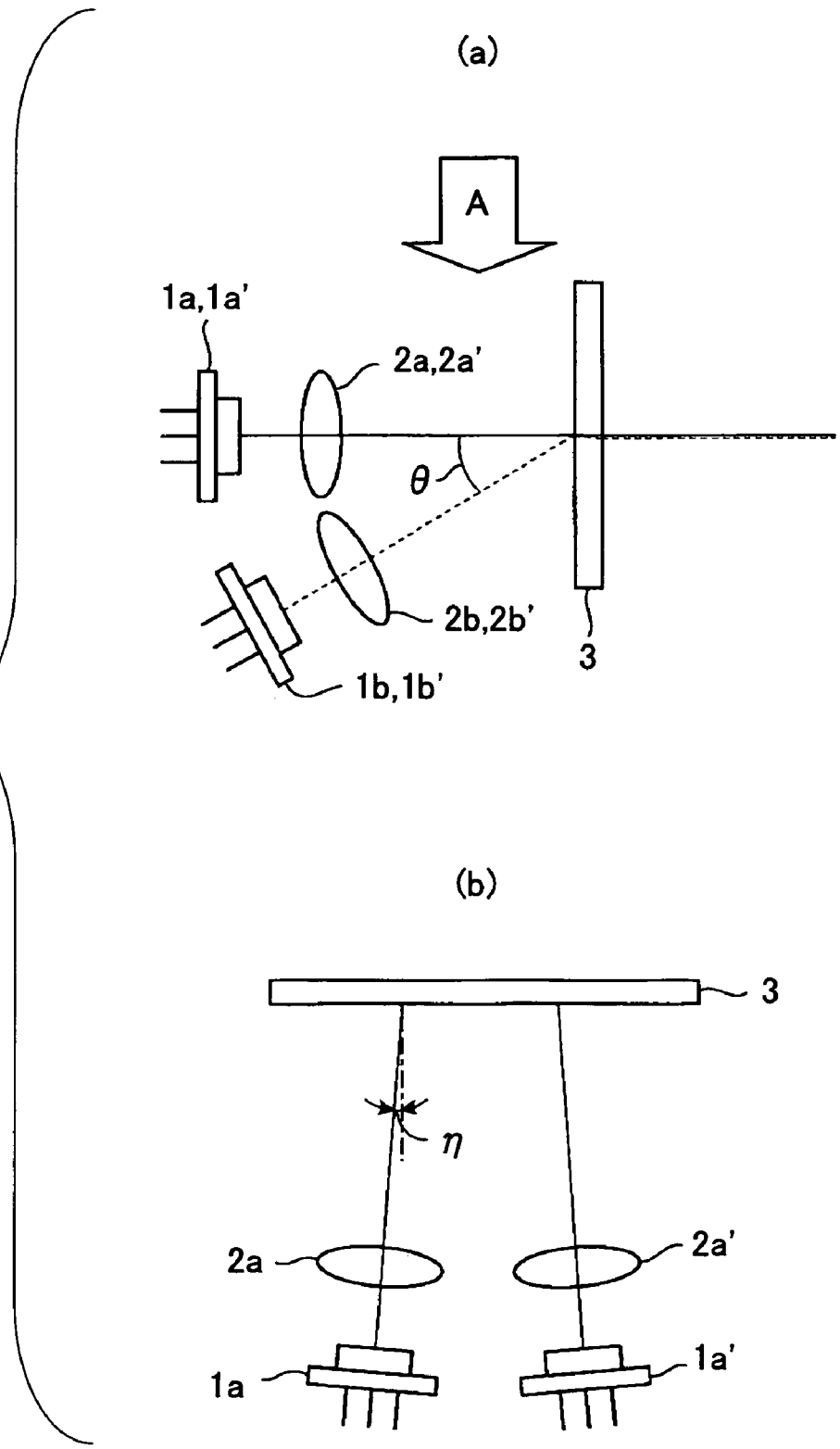
FIG. 11A and FIG. 11B are schematic views of a multi-beam light source unit according to a fourth embodiment of the present invention, where

FIG. 11A and FIG. 11B are schematic views of a multi-beam light source unit according to a fourth embodiment of the present invention, where FIG. 11A is a side view and FIG. 11B is a plan view.

In the present embodiment, four semiconductor lasers $1a$, $1a'$, $1b$ and $1b'$ are used to increase the number of light beams.

The four light beams emitted from the semiconductor lasers $1a$, $1a'$, $1b$ and $1b'$ are guided to the light beam combining element 3 by four corresponding first optical systems 2.

FIG. 11B is a plan view of the multi-beam light source unit viewed along the arrow A in FIG. 11A.

As shown in FIG. 11B, the two light beams emitted from the semiconductor lasers $1a$, $1a'$ are incident onto the light beam combining element 3 while being parallel to each other, or with a very small angle η in between. Because the angle η is far less than the angle θ, in the present embodiment, it is assumed that the incident four light beams are from two different directions, and the two directions have the angle of θ in between.

Precisely speaking, if the angle η is not zero, the incident light beams are from four different directions. Because the angle η is very small, namely, satisfying the relation θ>>η, the angle η is negligible.

As shown in FIG. 11B, the other two semiconductor lasers $1b$ and $1b'$, and two single-piece lenses $2b$ and $2b'$, which are arranged in a plane perpendicular to the paper in FIG. 11B, are partially overlapped with each other in FIG. 11B. Strictly speaking, the semiconductor lasers $1a$ and $1b$, $1a'$ and $1b'$ and the two single-piece lenses $2a$ and $2b$, $2a'$ and $2b'$ have an angle of θ in between as shown in FIG. 11A. Although the semiconductor lasers $1b$ and $1b'$ and the two single-piece lenses $2b$ and $2b'$, which are on the back side in FIG. 11B, are partially visible, illustration of the semiconductor lasers $1b$ and $1b'$ and the two single-piece lenses $2b$ and $2b'$ are omitted.

Fifth Embodiment

Figure 12:
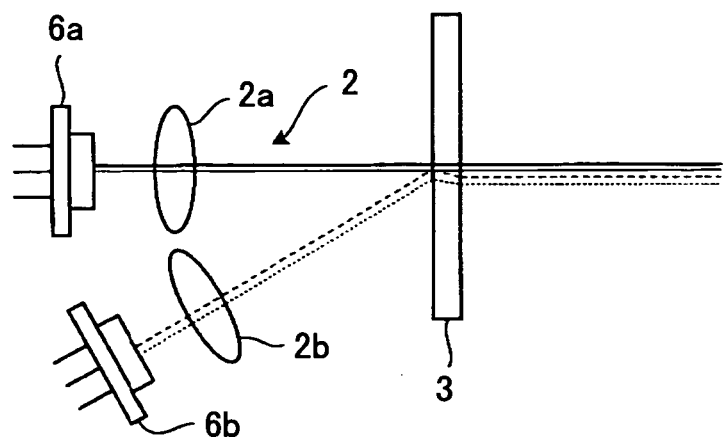
FIG. 12 is a schematic side view of a multi-beam light source unit according to a fifth embodiment of the present invention.

FIG. 12 is a schematic side view of a multi-beam light source unit according to a fifth embodiment of the present invention.

The present embodiment illustrates another example of an increased number of light beams.

In the present embodiment, two semiconductor laser arrays (for example, each laser array package includes two light emitting spots) are used as light sources. Four light beams emitted from the two semiconductor laser arrays $6a$ and $6b$ are guided to the light beam combining element 3 by two respective first optical systems 2, and the four incident light beams from two different directions are combined to be nearly in the same direction.

Four-beam semiconductor laser arrays or other multiple beam semiconductor laser arrays can be used with relatively higher cost.

In addition, four two-beam semiconductor laser arrays can be used to generate eight light beams at the same time, or four four-beam semiconductor laser arrays can be used to generate sixteen light beams at the same time.

Sixth Embodiment

Figure 13:
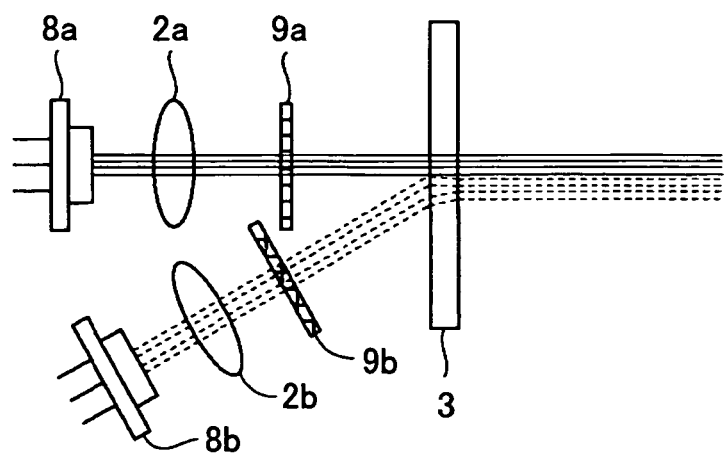
FIG. 13 is a schematic side view of a multi-beam light source unit according to a sixth embodiment of the present invention.

FIG. 13 is a schematic side view of a multi-beam light source unit according to a sixth embodiment of the present invention.

In recent years, a multi-beam vertical cavity surface emitting laser (VCSEL) has been commercially available, which is one type of surface emitting laser, and may include several or several tens light emitting spots in one package.

In the present embodiment, two multi-beam VCSEL $8a$ and $8b$ are used as light sources. When using a VCSEL as a light source, since the polarization directions of the light beams from VCSEL are random, it is necessary to arrange polarization control elements 9 ($9a$, $9b$), such as a polarizer, in front of the light beam combining element 3 to control the polarization direction. With the VCSEL it is possible to greatly increase the number of light beams.

It is well known that the wavelength of newly produced semiconductor lasers is becoming shorter and shorter. In the related art, the wavelength of the semiconductor laser is around 780 nm, but recently, a red laser at about 655 nm has been in practical use. Further, a blue laser at about 405 nm has become commercially available.

In the present embodiment, the light beam combining element 3 may be fabricated in accordance with the wavelengths of the incident light beams from the light sources. With a short wavelength of the incident light beam, it is possible to reduce the size of the light spot.

Seventh Embodiment

Figure 14:
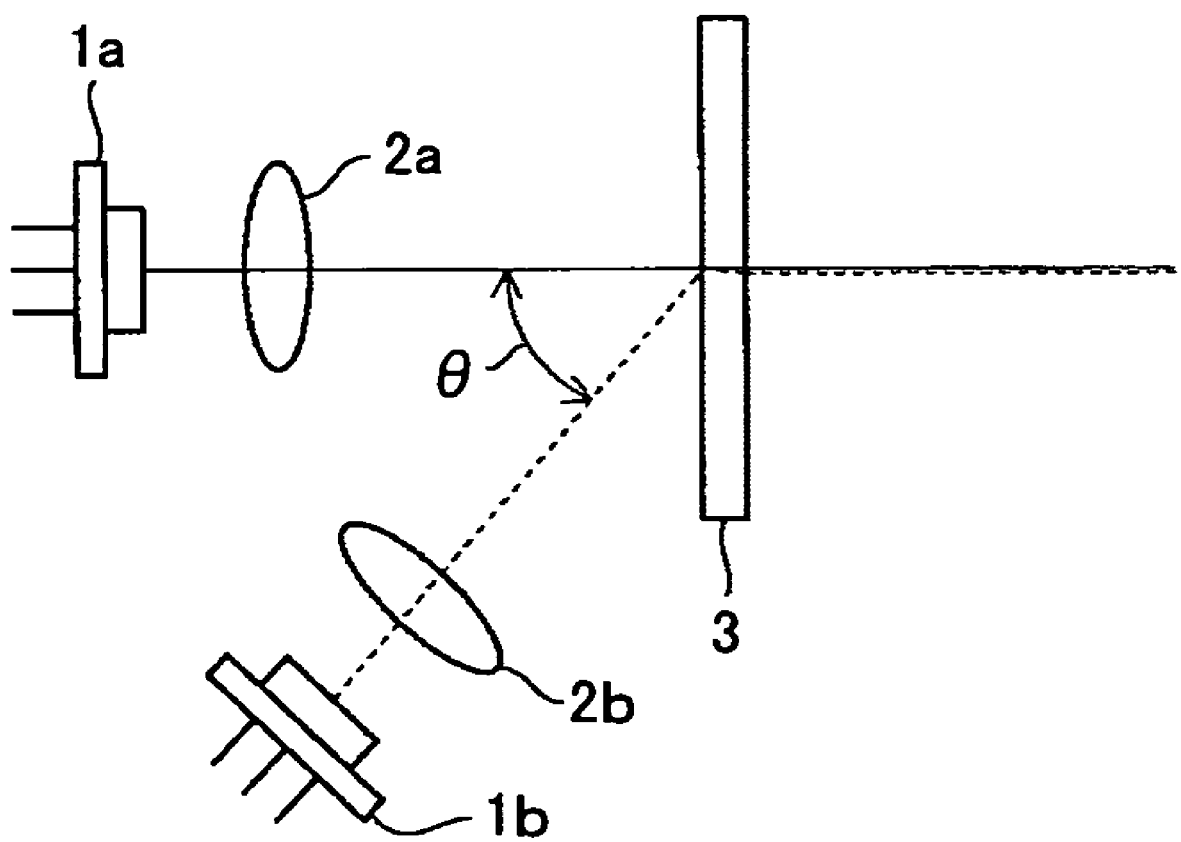
FIG. 14 is a schematic side view of a multi-beam light source unit according to a seventh embodiment of the present invention.

FIG. 14 is a schematic side view of a multi-beam light source unit according to a seventh embodiment of the present invention.

In the present embodiment, the light beams from two different directions have an acute angle in between.

Figure 15:
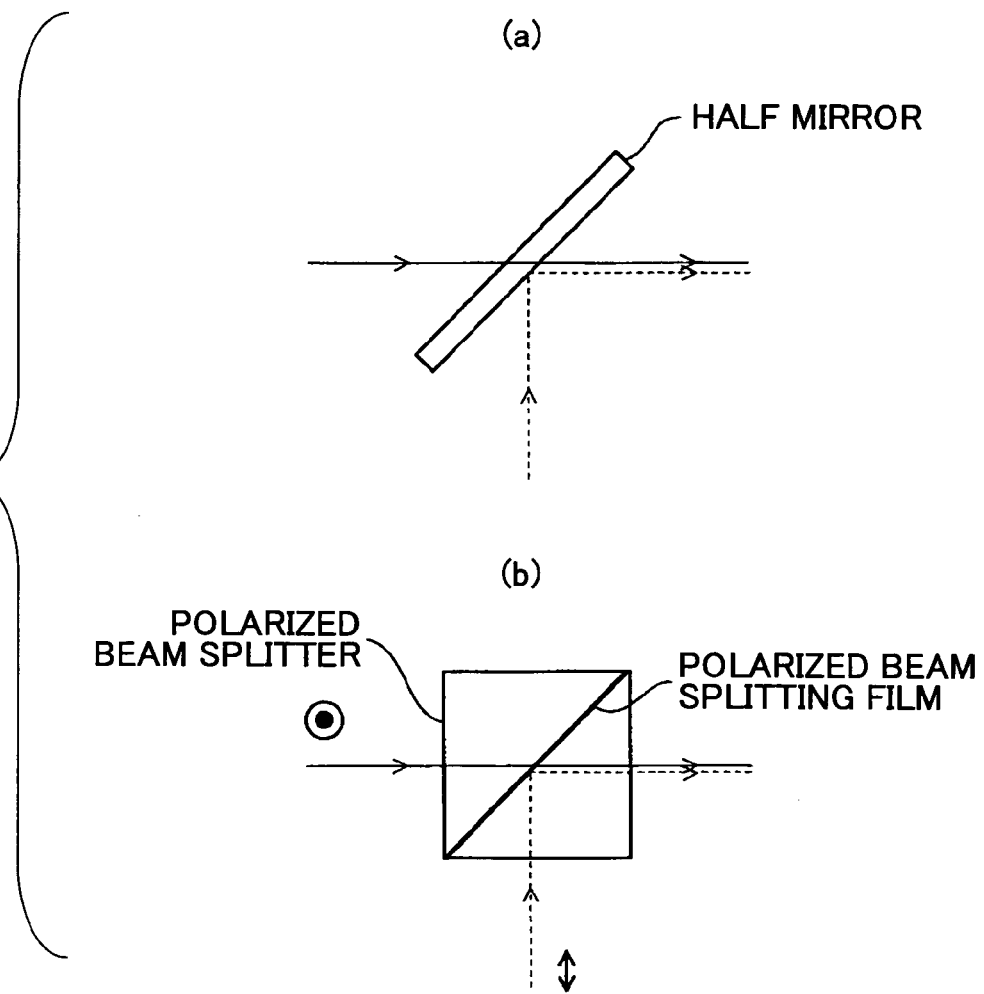
FIG. 15A and FIG. 15B are schematic views illustrating an example of a light beam combining element in the related art, where

FIG. 15A and FIG. 15B are schematic views illustrating an example of a light beam combining element in the related art, where FIG. 15A shows a light beam combining element using a half mirror, and FIG. 15B shows a light beam combining element using a polarized beam splitter.

With either of the light beam combining elements in the related art shown in FIG. 15A and FIG. 15B, the angle between the light beams from two different directions is limited to 90 degrees due to the characteristics of the half mirror and the polarized beam splitter.

Figure 16:
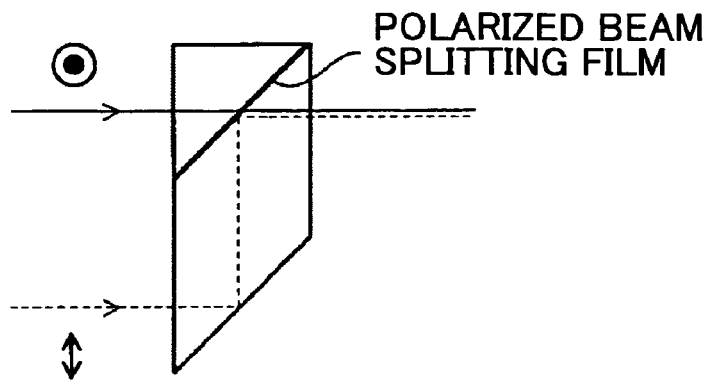
FIG. 16 is a schematic view illustrating another example of a light beam combining element in the related art using a beam combining prism.

FIG. 16 is a schematic view illustrating another example of a light beam combining element in the related art using a beam combining prism.

When using the light beam combining element as shown in FIG. 16, the angle between the two incident light beams is limited to zero degrees.

In the present embodiment, as shown in FIG. 14, according to the above-mentioned formula (1), the angle θ is variable according to the period P of the diffractive element, and it is possible for the angle between the light beams from two different directions to be an acute angle (that is, 0°<θ<90°).

Figure 17:
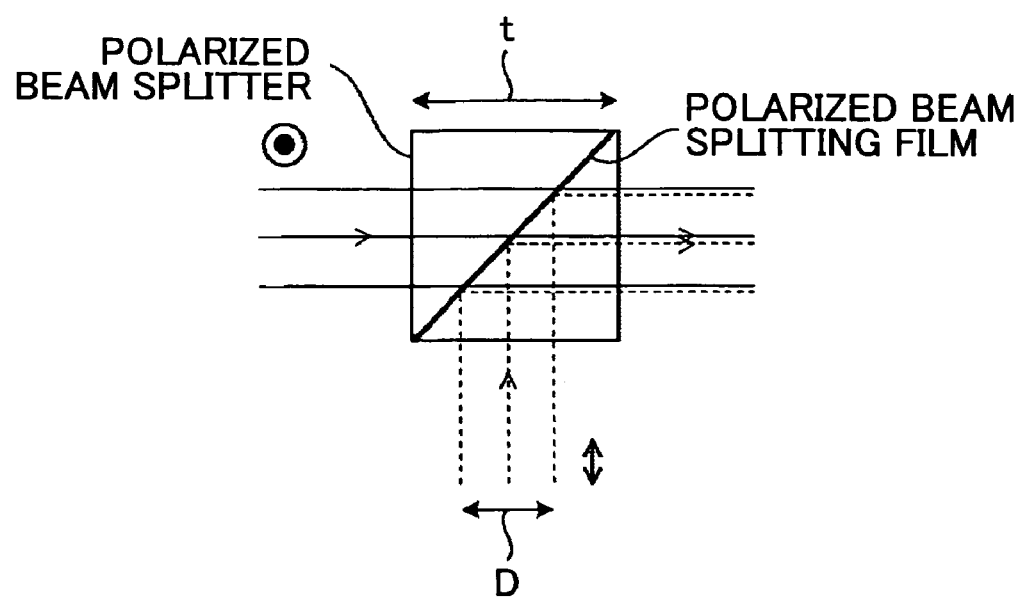
FIG. 17 is a schematic view illustrating polarization characteristics of a light beam combining element in the related art using a polarized beam splitter.

FIG. 17 is a schematic view illustrating an example of polarization characteristics of a light beam combining element in the related art using a polarized beam splitter.

As shown in FIG. 17, in the related art, a polarized beam splitter or a beam combining prism has a polarized beam splitting film to split or combine two incident light beams, which have an angle of 90 degrees therebetween and are incident on opposite sides of the polarized beam splitting film. In this case, the optical element becomes thick. Namely, the thickness t of the optical element cannot be less than the width D of a light beam.

In the present embodiment, however, the light beam combining element 3 combined the incident light beams at the same side as the optical surface for splitting or combining the light beams, so that the optical element can be made thin regardless of the width D of light beam. For example, in the above embodiment, the optical element can have a thin plate shape.

Figure 18:
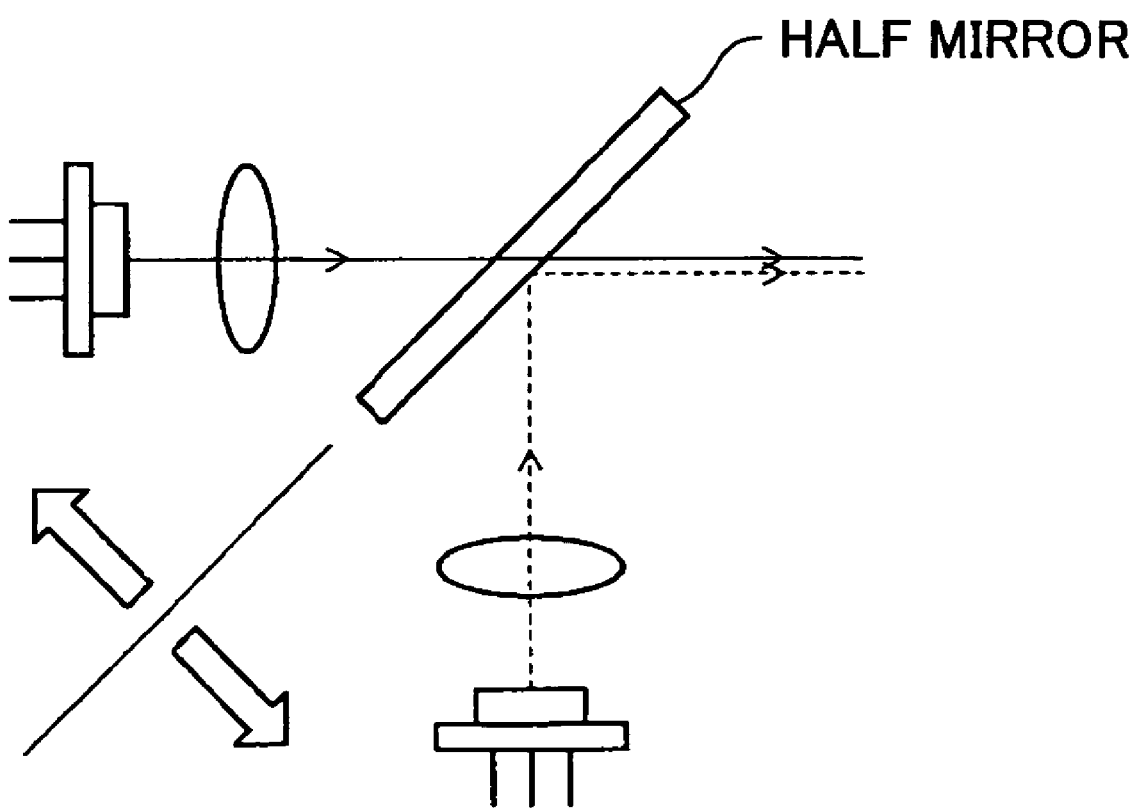
FIG. 18 is a schematic view illustrating polarization characteristics of a light beam combining element in the related art using a half mirror.

FIG. 18 is a schematic view illustrating another example of polarization characteristics of a light beam combining element in the related art using a half mirror.

As shown in FIG. 18, in the related art, one of the incident light beams is on the same side of the optical element as the combined light beam. Thus, the two light sources have to be separated apart from each other. This layout suffers from limitations of space.

In the present embodiment, however, the two incident light beams and the combined light beam are on the opposite sides of the light beam combining element 3, so that it is possible to arrange the two light sources to be close to each other, and this increases the layout degree of freedom.

Eighth Embodiment

Figure 19:
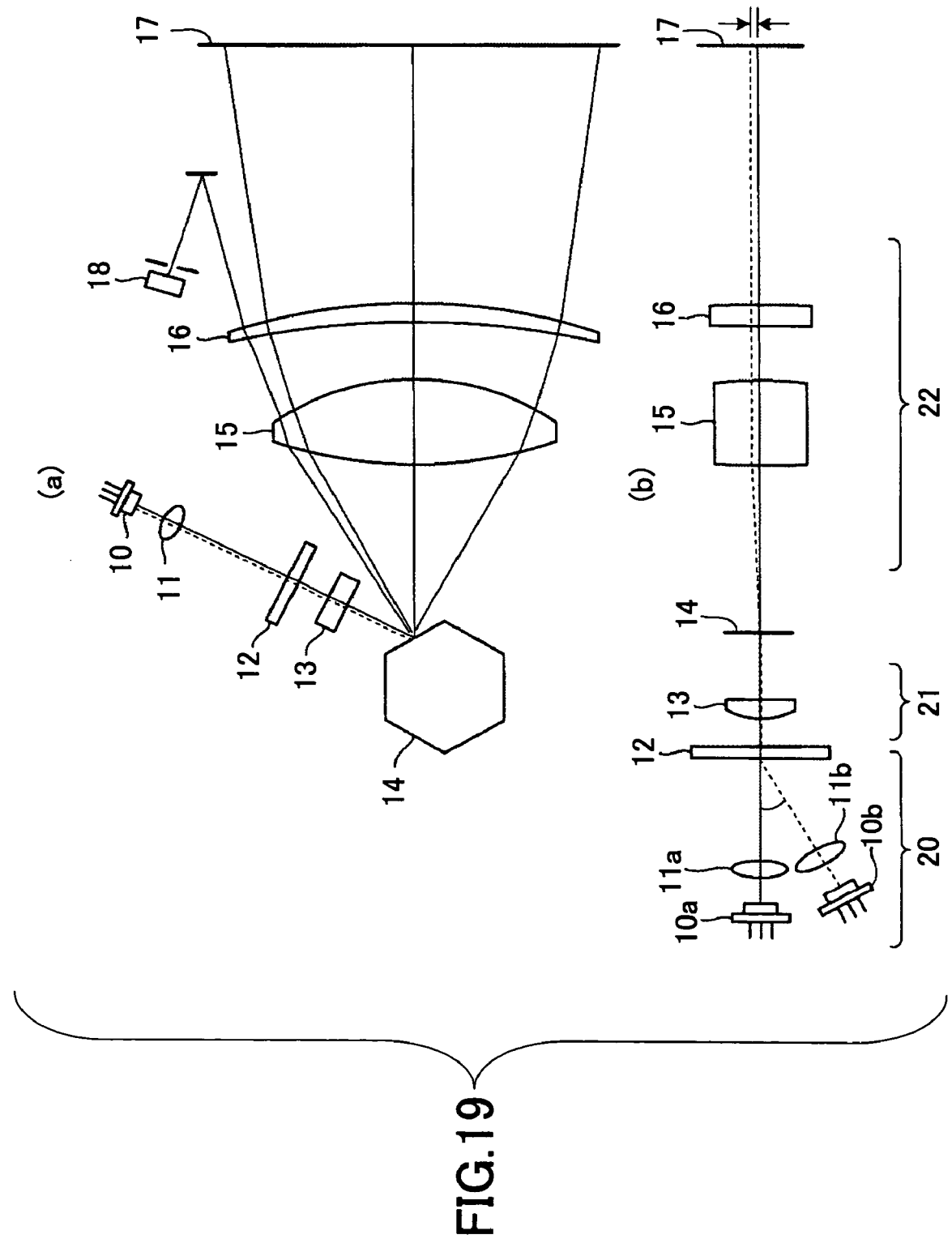
FIG. 19A and FIG. 19B are schematic views of an optical scanning device according to an eighth embodiment of the present invention, where

FIG. 19A and FIG. 19B are schematic views of an optical scanning device according to an eighth embodiment of the present invention, where FIG. 19A is a plan view and FIG. 19B is a side view.

In FIG. 19A and FIG. 19B, the direction in which the light beam is deflected and scanned is referred to as a "main scan direction", and the direction perpendicular to the main scan direction is referred to as a "sub scan direction".

In FIG. 19A and FIG. 19B, a multi-beam light source unit 20 includes light sources 10 (for example, semiconductor lasers 10a, 10b), a first optical system 11 (for example, single-piece lenses 11a, 11b), and a light beam combining element 12 (for example, the same as the light beam combining element 3).

The single-piece lenses 11a and 11b shape the light beams emitted from the semiconductor lasers 10a and 10b, respectively, into parallel beams. At least portions of two parallel light beams coming from two different directions are combined by the light beam combining element 12 at nearly the same time.

The combined light beam is guided into a second optical system 21. For example, the second optical system 21 includes cylindrical lenses 13, and the combined two light beams are condensed in one direction by the respective cylindrical lenses 13 so as to be shaped into line-shaped beams, hence forming line images on the deflection-reflection surface of the deflector 14.

Then, the light beams are guided into a third optical system 22. For example, the third optical system 22 includes two scanning imaging lenses 15, 16. The two light beams are deflected and scanned by the deflector 14 are converted into desired light spots by the scanning imaging lenses 15, 16.

The thus formed two light spots are at a certain interval and are scanned on a scan surface 17, and the two light spots have a preset interval in the sub scan direction.

The two light beams emitted from the light beam combining element 12 are combined nearly in the same direction with a small angle θ between them so that the interval between the two light spots in the sub scan direction is a specified value.

The unnecessary light beams, which are not combined by the light beam combining element 12, are shielded inside or outside the optical scanning device, so that these unnecessary light beams are not condensed on the scan surface 17 to form light spots.

In FIG. 19A, the reference number 18 indicates a synchronization detection sensor.

Ninth Embodiment

Figure 20:
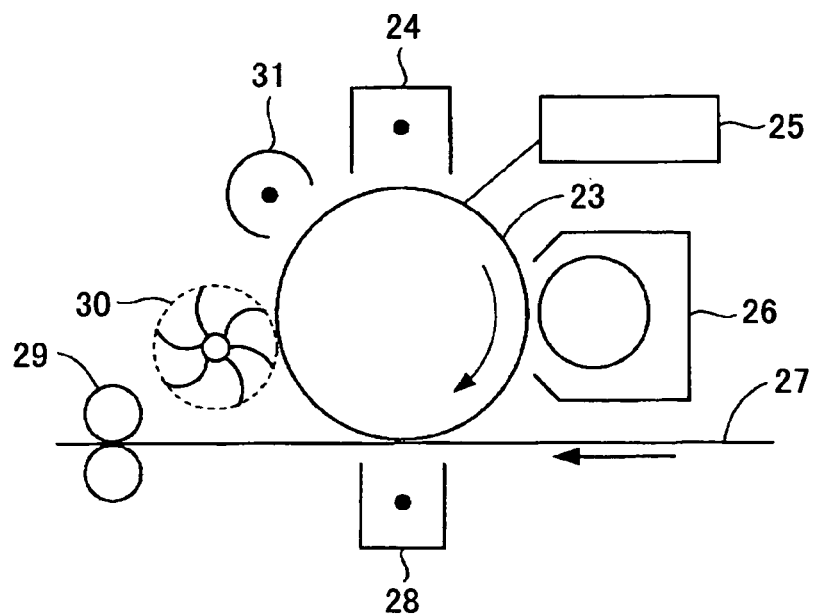
FIG. 20 is a schematic view of an image formation apparatus according to a ninth embodiment of the present invention.

FIG. 20 is a schematic view of an image formation apparatus according to a ninth embodiment of the present invention.

In an image formation apparatus, for example, an image can be formed by an electrophotographic technique. Below, the electrophotographic technique is explained briefly.

In the image formation apparatus, an image carrier (for example, a photoconductor) 23 is charged by a charging unit 24 (charging step); spots from an optical scanning device (an optical write unit or an exposure unit) 25 are formed on the image carrier 23 to form a latent image thereon (exposure step); a developing unit 26 applies toner on the latent image to form a visible toner image (developing step), a transfer unit 28 transfers the toner image to recording paper 27(transferring step); a fusing unit 29 applies pressure or heat to fix the toner image on the recording paper (fusing step).

Then the residual toner on the image carrier 23 is removed by a cleaner 30, and further, the charge on the image carrier 23 is discharged by a discharging unit 31.

The optical scanning device 25 of the present invention can also be used in a tandem-type image formation apparatus which is suitable for outputting color images at high speed.

10th Embodiment

Figure 21:
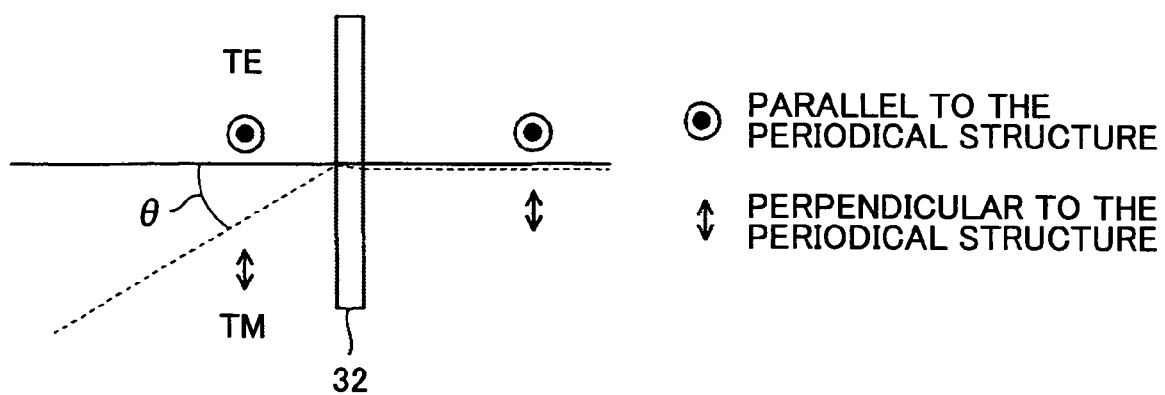
FIG. 21 is a schematic view illustrating the light beam combination function of the light beam combining element according to a 10th embodiment.

FIG. 21 is a schematic view illustrating light beam combination function of the light beam combining element according to a 10th embodiment of the present invention.

As shown in FIG. 21, a light beam combining element 32 (for example, the same as the light beam combining element 3) transmits at least portions of incident light beams from two different directions separated by an angle θ nearly in the same direction. For example, the two exiting light beams may exit in the same direction or may be separated by a small angle φ. In other words, the two incident light beams are combined by the light beam combining element 32.

Figure 22:
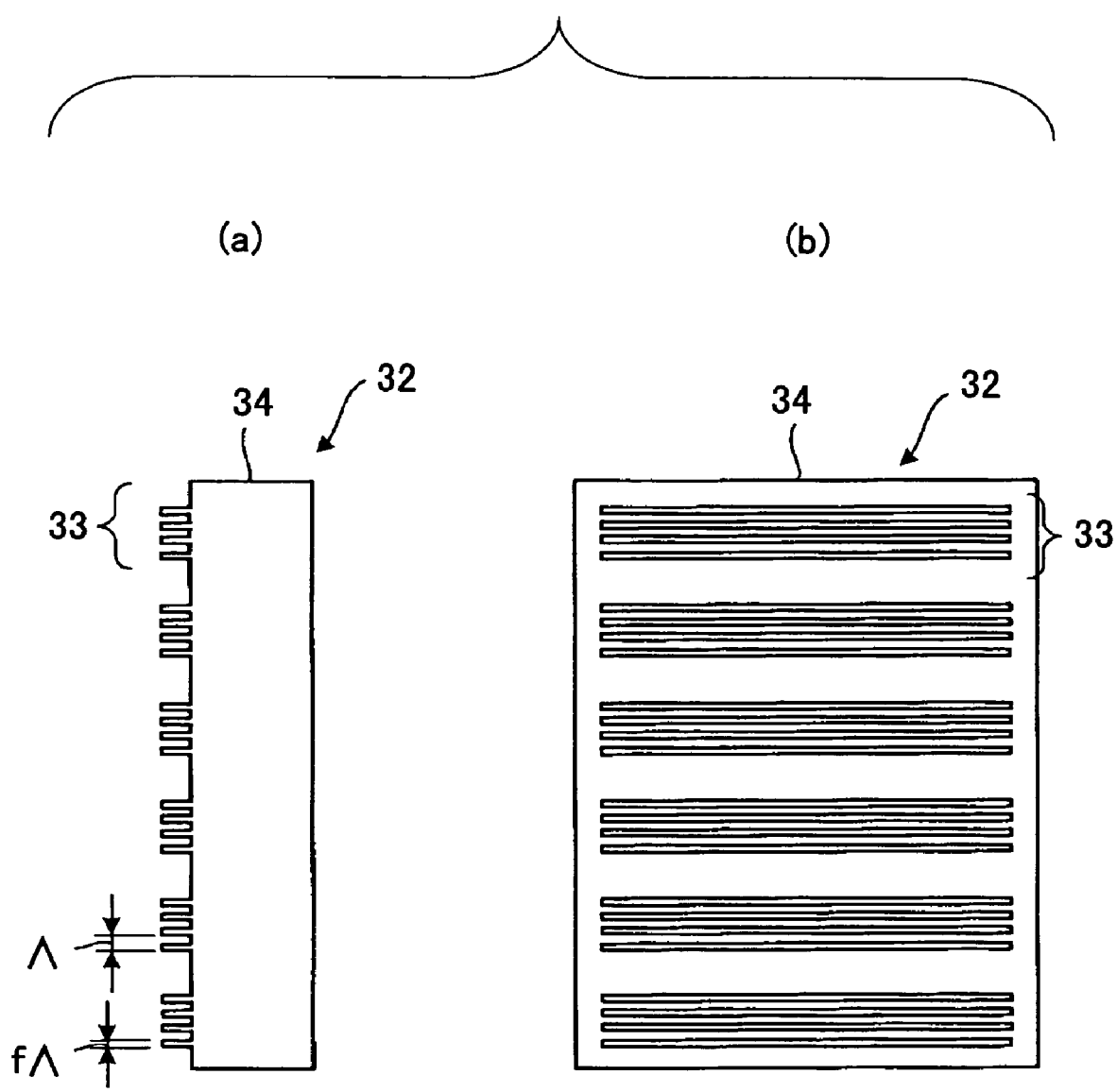
FIG. 22A and FIG. 22B are enlarged views of a light beam combining element in the present embodiment, where

FIG. 22A and FIG. 22B are enlarged views of a light beam combining element in the present embodiment, where FIG. 22A is a side view and FIG. 22B is a plan view.

As shown in FIG. 22A and FIG. 22B, on the surface of the light beam combining element 32, through which the light beams are transmitted, a periodic structure 33 is formed having a period shorter than wavelengths of the light source. In the example shown in FIG. 22A and FIG. 22B, the periodic structure 33 is formed from the same material as the substrate 34 of optical elements.

Assume the period (pitch) of the periodic structure 33 is denoted to be $\Lambda$, and the wavelength of the light source is denoted to be $\lambda$, then the periodic structure 33 is fabricated to satisfy $\lambda > \Lambda$. Because the period $\Lambda$ of the periodic structure 33 is less than the wavelength $\lambda$ of the light source, diffraction of ±1st order or higher order does not occur; only zero-th order diffraction occurs.

Because of such a structure, the light beam combining element 32 has birefringence characteristics, that is, the behavior of the diffracted light changes along with the polarization direction of the incident light beam.

Assume the refractive index of the substrate 34 of the light beam combining element 32 is represented by n. It is known that the refractive index of the periodic structure 33 having a period shorter than the wavelength of the incident light beam is expressed by an "effective refractive index".

In the periodic structure 33, which includes a periodic arrangement of air (the refractive index is 1) and the substrate 34 (the refractive index is n), the period of the periodic structure 33 is Λ, and the width of the element formed from the same material as the substrate 34 is fΛ (f is a feeling factor). The refractive index n corresponding to different polarization directions (TE, TM) can be expressed as below.

$$n(TE)=\sqrt{\{fn^2+(1-f)\}},$$

$$n(TM)=\sqrt{\{n^2/\{f+(1-f)n^2\}\}}$$

By controlling the feeling factor f, namely, by controlling the shape and the period of the periodic structure 33, it is possible to control the effective refractive index which is dependent on the polarization direction.

Thus, the light beam combining element 32 acts as a binary diffractive grating having a period P (here, P>λ) and a refractive index n(TM) relative to the TM polarized light beam, and acts as a binary diffractive grating having a period P and a refractive index n(TE) relative to the TE polarized light beam.

Figure 23:
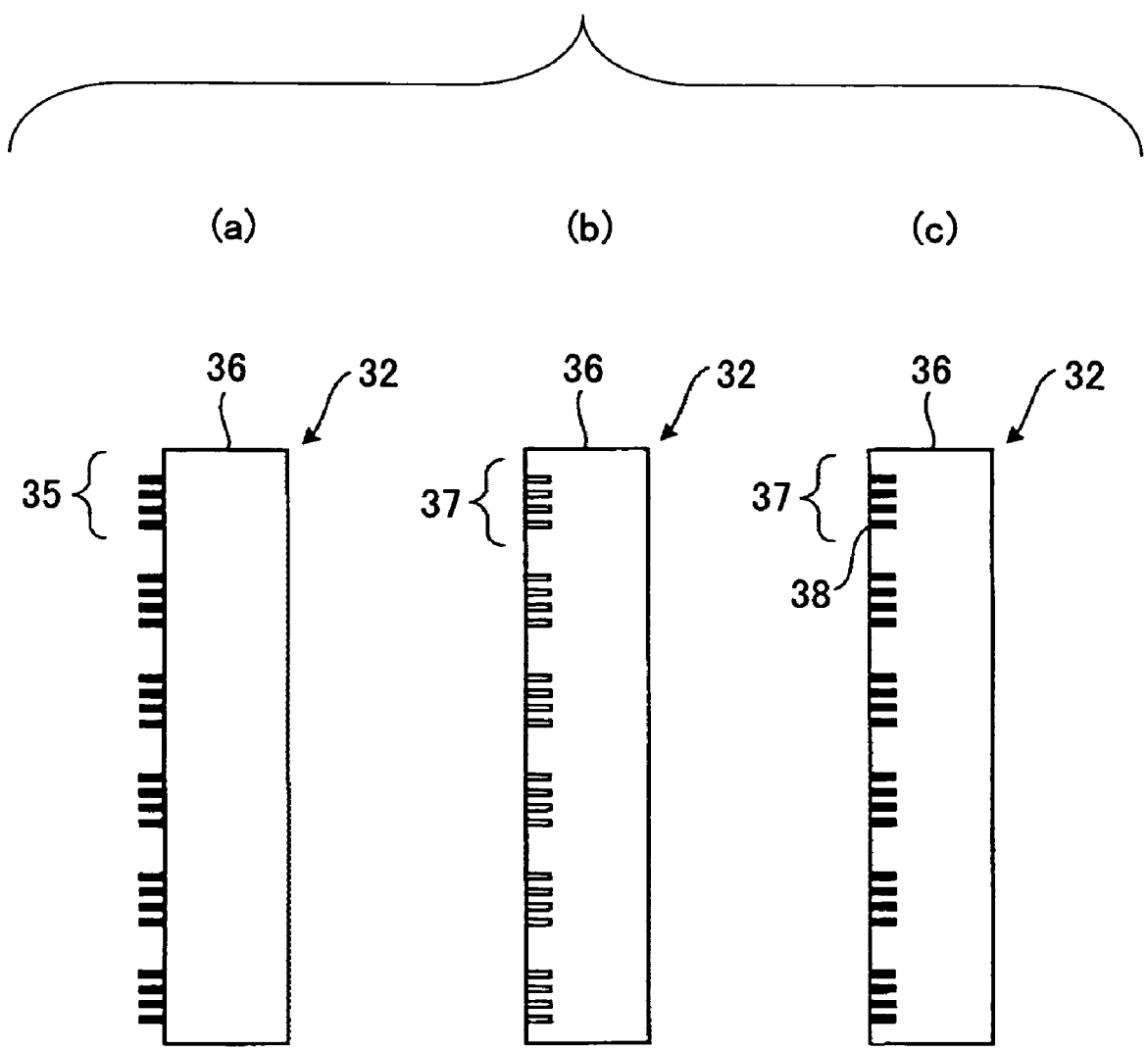
FIG. 23A through FIG. 23C are schematic views illustrating modifications of the periodic structure of the light beam combining element.

FIG. 23A through FIG. 23C are schematic views illustrating modifications of the periodic structure of the light beam combining element.

In a light beam combining element 32 shown in FIG. 23A, the periodic structure 35 is formed from a material different from the substrate 36.

In a light beam combining element 32 shown in FIG. 23B, the periodic structure 37 is formed as depressions in the substrate 36.

In a light beam combining element 32 shown in FIG. 23C, the periodic structure 37 is formed as depressions in the substrate 36 with the depressions being filled with another medium 38.

An optical element with a periodic structure of a period shorter than the wavelength of incident light can be fabricated by, for example, a combination of known fine processing technologies such as electron beam writing and dry etching.

In recent years, a duplication technique known as "nanoimprint" has been proposed, which is capable of mass production at low cost by using molds fabricated by the fine processing technologies. With this technique, the light beam combining element 3 can be fabricated at low cost compared to the polarized beam splitter or the beam combining prism.

In the related art, with a light beam combining element using the half mirror, the polarized beam splitter, or the beam combining prism, due to the characteristics of these elements, the angle between the two incident light beams has to be limited to 90 degrees or zero degrees.

With the light beam combining element of the present embodiment, the angle θ between the two incident light beams is selectable according to the period P of the diffractive element.

In the related art, a polarized beam splitter or a beam combining prism has a polarized beam splitting film to split two incident light beams, which are separated by an angle of 90 degrees and are incident from opposite sides of the polarized beam splitting film. In this case, the optical element becomes thick. Namely, the thickness t of the optical element cannot be less than the width D of the light beam.

In the present embodiment, however, the light beam combining element 3 splits the incident light beams at the same side as the optical surface for splitting the light beam, thus, the optical element can be made thin regardless of the width D of light beam. This can reduce the cost and size of the optical element.

In the related art, when the half mirror is used, one of the incident light beams is on the same side of the optical element as the combined light beam. Thus, the two light sources have to be separated apart from each other. This layout suffers from constraints of space.

In the present embodiment, however, the two incident light beams and the combined light beam are on the opposite sides of the light beam combining element so that it is possible to arrange the two light sources to be close, and this increases the layout degree of freedom.

The light beam combining element of the present invention can be combined with an optical system for shaping a light beam incident on the light beam combining element, or with an optical system for shaping a light beam transmitted from the light beam combining element. Especially, the light beam combining element has characteristics more than the polarized beam splitter or the like of the related art, so that it is possible to construct a novel, inexpensive and compact optical system having high layout degree of freedom.

Figure 24:
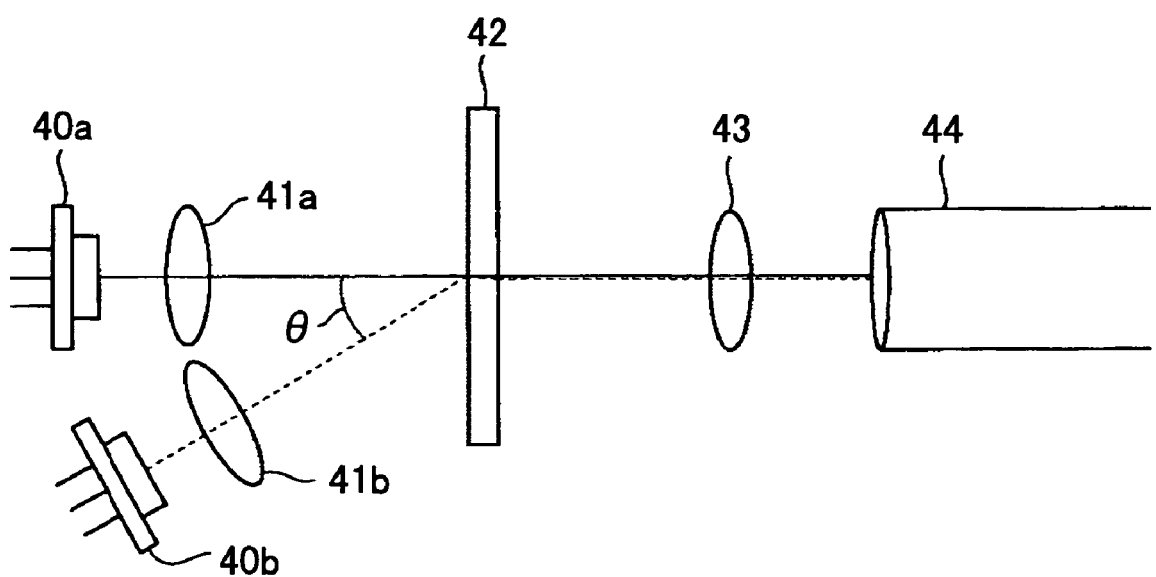
FIG. 24 is a schematic view illustrating an optical combination system according to an 11th embodiment of the present invention.

FIG. 24 is a schematic view illustrating an optical combination system according to an 11th embodiment of the present invention.

For example, the optical combination system of the present embodiment may include a semiconductor laser and optical fibers, can be used in optical communication.

As shown in FIG. 24, the optical combination system of the present embodiment includes two semiconductor lasers 40a and 40b; two single-piece lenses 41a and 41b which convert the light beams emitted from the semiconductor lasers 40a and 40b into parallel beams; a light beam combining element 42 (for example, the same as the light beam combining element 3), which transmits (combines) at least portions of two incident light beams coming from two different directions in nearly the same direction; a single-piece lens 43 for condensing the combined parallel light beams; and an optical fiber 44.

By combining signals modulated by the two semiconductor lasers 40a and 40b, it is possible to transmit the optical signal at high speed.

By using this optical combination system, it is possible to realize an inexpensive and compact optical apparatus having novel characteristics.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Application No. 2005-120029 filed on Apr. 18, 2005, the entire contents of which are hereby incorporated by reference.

What is claimed is:

1. A multi-beam light source unit, comprising:
    two or more light sources;
    two or more first optical systems that shape light beams from the light sources; and
    a light beam combining element having a periodic structure of a period shorter than wavelengths of the light beams, the light beams being incident on the light beam combining element from different directions, the light beam combining element transmitting at least portions of the light beams nearly in the same direction.

2. The multi-beam light source unit as claimed in claim 1, wherein the light sources and the first optical systems are arranged so that the incident light beams are linearly polarized light beams having polarization states different from each other by 90 degrees.

3. The multi-beam light source unit as claimed in claim 2, wherein
    the linearly polarized light beams have the same polarization direction, and one of the first optical systems includes a λ/2 plate.

4. The multi-beam light source unit as claimed in claim 2, wherein a λ/4 plate is arranged behind the light beam combining element along a light propagating direction.

5. The multi-beam light source unit as claimed in claim 1, wherein there are four said light sources and four said first optical systems.

6. The multi-beam light source unit as claimed in claim 1, wherein each of the light sources emits at least two light beams.

7. The multi-beam light source unit as claimed in claim 1, wherein each of the light sources is a surface emitting semiconductor laser.

8. The multi-beam light source unit as claimed in claim 1, wherein each of the light sources is a blue light laser.

9. The multi-beam light source unit as claimed in claim 1, wherein the light beams from different directions are separated by an acute angle.

10. The multi-beam light source unit as claimed in claim 1, wherein the light beam combining element has a plate shape.

11. The multi-beam light source unit as claimed in claim 1, wherein the incident light beams from different directions and the light beams transmitted by the light beam combining element nearly in the same direction are on opposite sides of the light beam combining element.

12. An optical scanning device, comprising:
a multi-beam light source unit;
a second optical system that guides a light beam from the multi-beam light source unit to a light deflector;
the light deflector that deflects and scans the light beam from the second optical system; and
a third optical system that forms a light spot of the scanning light beam deflected by the light deflector on a scanning surface;
wherein
the multi-beam light source unit includes
two or more light sources;
two or more first optical systems that shape light beams from the light sources; and
a light beam combining element having a periodic structure of a period shorter than wavelengths of the light beams, the light beams being incident on the light beam combining element from different directions, the light beam combining element transmitting at least portions of the light beams nearly in the same direction.

13. An image formation apparatus, comprising: an optical scanning device;
wherein
the optical scanning device includes
a multi-beam light source unit;
a second optical system that guides a light beam from the multi-beam light source unit to a light deflector, the light deflector deflecting and scanning the light beam from the second optical system; and
a third optical system that forms a light spot of the scanning light beam deflected by the light deflector on a scanning surface;
wherein
the multi-beam light source unit includes
two or more light sources;
two or more first optical systems that shape light beams from the light sources; and
a light beam combining element having a periodic structure of a period shorter than wavelengths of the light beams, the light beams being incident on the light beam combining element from different directions, the light beam combining element transmitting at least portions of the light beams nearly in the same direction.

14. A light beam combining element, comprising:
a periodic structure of a period shorter than wavelengths of light beams;
wherein
the light beams are incident on the light beam combining element from different directions, and the light beam combining element transmits at least portions of the light beams nearly in the same direction.

15. The light beam combining element as claimed in claim 14, wherein the light beams from different directions are separated by an acute angle.

16. The light beam combining element as claimed in claim 14, wherein the light beam combining element has a plate shape.

17. The light beam combining element as claimed in claim 14, wherein the incident light beams from different directions and the light beams transmitted by the light beam combining element nearly in the same direction are on opposite sides of the light beam combining element.

18. An optical system, comprising:
a light beam combining element;
wherein
the light beam combining element includes
a periodic structure of a period shorter than wavelengths of the light beams;
wherein light beams are incident on the light beam combining element from different directions, and the light beam combining element transmits at least portions of the light beams nearly in the same direction.

19. An optical apparatus, comprising:
an optical system;
wherein
the optical system includes
a light beam combining element;
wherein
the light beam combining element includes
a periodic structure of a period shorter than wavelengths of light beams, wherein the light beams are incident on the light beam combining element from different directions, and the light beam combining element transmits at least portions of the light beams nearly in the same direction.

* * * * *